(12) United States Patent
Pirzer

(10) Patent No.: US 12,546,087 B2
(45) Date of Patent: Feb. 10, 2026

(54) EXCAVATOR COUPLING SYSTEM

(71) Applicant: Caterpillar Inc., Peoria, IL (US)

(72) Inventor: Wolfgang Pirzer, Schwandorf (DE)

(73) Assignee: Caterpillar Inc., Peoria, IL (US)

( * ) Notice: Subject to any disclaimer, the term of this patent is extended or adjusted under 35 U.S.C. 154(b) by 576 days.

(21) Appl. No.: 18/010,307

(22) PCT Filed: Jun. 9, 2021

(86) PCT No.: PCT/US2021/070676
§ 371 (c)(1),
(2) Date: Dec. 14, 2022

(87) PCT Pub. No.: WO2021/258095
PCT Pub. Date: Dec. 23, 2021

(65) Prior Publication Data
US 2023/0279635 A1 Sep. 7, 2023

(30) Foreign Application Priority Data
Jun. 16, 2020 (GB) .................................... 2009140

(51) Int. Cl.
E02F 3/76 (2006.01)
B60D 1/52 (2006.01)
E02F 3/815 (2006.01)

(52) U.S. Cl.
CPC .............. *E02F 3/8152* (2013.01); *B60D 1/52* (2013.01)

(58) Field of Classification Search
CPC ....... E02F 3/8152; E02F 3/7622; E02F 3/815; E02F 3/80; E02F 3/40; E02F 3/962; B60D 1/52; B60D 1/48; B60D 1/50
See application file for complete search history.

(56) References Cited

U.S. PATENT DOCUMENTS

| 5,607,251 A | 3/1997 | Rafn |
| 5,626,435 A | 5/1997 | Wohlhueter |
| 6,302,617 B1 | 10/2001 | Rumpp |
| 6,487,799 B2 | 12/2002 | Burk |

(Continued)

FOREIGN PATENT DOCUMENTS

| CN | 1440336 A | 9/2003 |
| CN | 104994825 A | 10/2015 |

(Continued)

OTHER PUBLICATIONS

International Search Report related to Application No. PCT/US2021/070676; reported on Oct. 13, 2021.

(Continued)

*Primary Examiner* — Joseph M Rocca
*Assistant Examiner* — Robert E Pezzuto

(57) ABSTRACT

An excavator coupling system for coupling a trailer hitch device to a dozer blade of an excavator. The excavator coupling system includes a keyhole component disposed on a front surface of the dozer blade of the excavator and a key component coupled with the trailer hitch device. The keyhole and key components are designed to forming a positive connection to couple the trailer hitch device to the dozer blade. The keyhole component is on the front of the dozer blade and provide for coupling the trailer hitch device to the dozer blade without accessing a rear portion of the dozer blade.

14 Claims, 15 Drawing Sheets

(56) References Cited

U.S. PATENT DOCUMENTS

| | | | |
|---|---|---|---|
| 6,604,752 B1 | 8/2003 | Gerres et al. | |
| 9,738,126 B2 * | 8/2017 | Mantovani | B60D 1/485 |
| 2001/0046434 A1 | 11/2001 | Burk | |
| 2003/0204972 A1 | 11/2003 | Cunningham et al. | |
| 2008/0053674 A1 * | 3/2008 | Frederick | E02F 3/8152 |
| | | | 172/684.5 |
| 2012/0198734 A1 | 8/2012 | Murray | |

FOREIGN PATENT DOCUMENTS

| | | |
|---|---|---|
| CN | 204728820 U | 10/2015 |
| CN | 212865854 U | 4/2021 |
| CN | 116872656 A | 10/2023 |
| DE | 102015210577 A | 12/2016 |
| EP | 0646482 A1 | 4/1995 |
| EP | 0568921 B1 | 11/1997 |
| WO | 9515421 | 6/1995 |

OTHER PUBLICATIONS

Great Britain Search Report related to Application No. 2009140.1; reported on Oct. 9, 2020.

* cited by examiner

EXCAVATOR COUPLING SYSTEM

CROSS-REFERENCE TO RELATED APPLICATION

This Application is a 35 USC § 371 US National Stage filing of International Application No. PCT/US2021/070676 filed on Jun. 9, 2021 which claims priority under the Paris Convention to Great Britain Patent Application No. 2009140.1 filed on Jun. 16, 2020.

TECHNICAL FIELD

Embodiments of the present disclosure describe an excavator coupling system for coupling a trailer hitch device to a dozer blade of an excavator.

BACKGROUND

Trailers are used today for many purposes such as construction, agriculture and recreation. Trailers are often used on off-road sites, such as construction and agricultural sites. Off-road equipment such as loaders, dozers and excavators are mostly not suitably configured for moving a trailer.

Sometimes users of wheeled excavators need to attach a trailer to the machine for transporting material and work tools. While it is relatively easy to attach commercially available trailer hitch to the undercarriage of the machine, it is more difficult to do the same if a dozer plate is assembled. Dismantling the dozer blade each time to attach a trailer is very time-consuming and therefore not a satisfactory solution.

Trailer hitches may be mounted to the dozer blade with a system that passes through, over or under the dozer blade with a locking mechanism on the rear of the dozer blade. This awkward for the machine operator and has economics as well as safety constraints. Further, the connection box providing hydraulic and electrical connections is disposed behind the dozer plate on the machine body, which is cumbersome to access for a user to make the required connections for attaching the trailer and, again, has safety constraints.

U.S. Patent Pub. No. 20120198734A1 describes an integrated hitch device for off-road equipment. The hitch system consists of a receiver plate attached directly and permanently by welding or other means on the rear of the machine. A hitch attachment tool bolts onto a receiver plate when needed and is removed when not needed. The hitch attachment is bolted onto the receiver plate by bolts that are positioned on/accessed from the rear of the dozer blade.

SUMMARY

Embodiments of the present disclosure provide a coupling system for coupling a trailer to an excavator, which contributes to an improved comfort, ergonomics and safety for mounting a trailer to an excavator.

Embodiments of the present disclosure provide an excavator coupling system for coupling a trailer hitch device to a dozer blade of an excavator with the features of claim 1. Preferred embodiments are set forth in the present specification, the Figures as well as the dependent claims.

Accordingly, an excavator coupling system for coupling a trailer hitch device to a dozer blade of an excavator is provided, comprising a keyhole component disposed on a front surface of the dozer blade of the excavator and a key component coupled with the trailer hitch device and configured to form a positive connection to couple the trailer hitch device to the dozer blade. The keyhole component and the key component provide for coupling the trailer hitch device to the dozer blade without accessing a rear portion of the dozer blade. In some embodiments, hydraulic and/or electrical connectors are provided on the front of the dozer blade providing for hitching a trailer to the machine, with electrical and/or hydraulic connection with access to only the front of the dozer blade.

BRIEF DESCRIPTION OF THE DRAWINGS

The present disclosure will be more readily appreciated by reference to the following detailed description when being considered in connection with the accompanying drawings in which.

DETAILED DESCRIPTION

Figure 1:
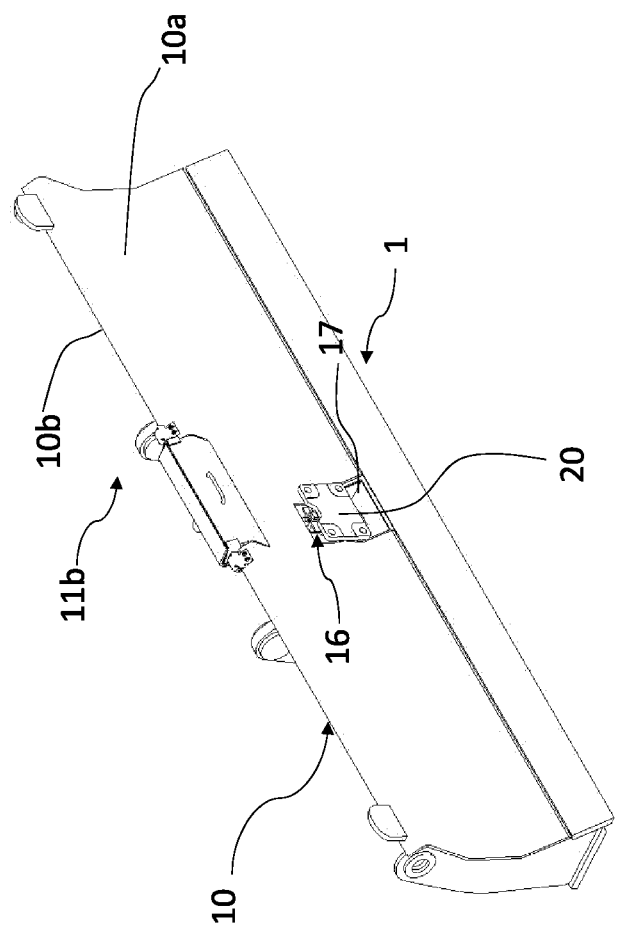
FIG. 1 schematically shows a perspective view of a coupling system couple a dozer blade and a trailer hitch device according to some embodiments.

In the following, some embodiments of the present disclosure will be explained in more detail with reference to the accompanying Figures. In the Figures, like elements are denoted by identical reference numerals and repeated description thereof may be omitted in order to avoid redundancies.

FIG. 1 shows an excavator coupling system 1 for coupling a trailer hitch device 20 to a dozer blade 10 of an excavator (not shown) according to some embodiments. The dozer blade 10 is configured such that a keyhole component 16 is disposed on a front surface 10a of the dozer blade 10. A key component 21 is coupled with the trailer hitch device 20 and configured to form a positive connection with the keyhole component of the dozer blade 10. The keyhole component 16 and the key component 21 provide for coupling the trailer hitch device 20 to the dozer blade 10 without accessing a rear portion 10b of the dozer blade 10. The keyhole component 16 is configured such that it can be arranged in a cut-out 17 of the dozer blade 10.

Figure 2:
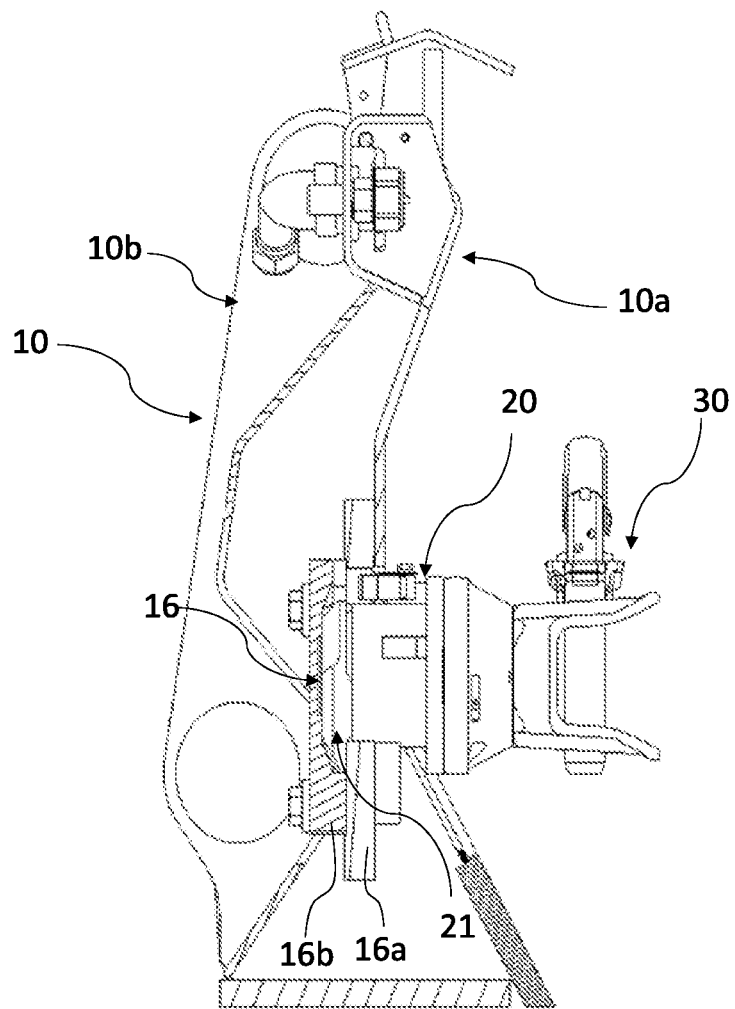
FIG. 2 schematically shows a sectional view of a dozer blade coupled with the trailer hitch device according to some embodiments.

The dozer blade 10 comprises a front surface 10a and a rear surface 10b and the positive connection is established within the dozer blade 10 between the front surface 10a and the rear surface 10b as shown in FIG. 2. The keyhole component 16 may be arranged and fixed into the dozer blade 10 by screws or other fastening means. The trailer hitch device 20 is configured for attaching a trailer hitch 30 on which a trailer can then be coupled. The keyhole component 16 comprises a front plate 16a and a rear plate 16b. In an example, the rear plate 16b is screwed to the front plate 16a. The rear plate 16b can be accessed from the rear surface 10b of the dozer blade 10. This allows to remove the rear plate 16b and the front plate 16a to each other if service of the keyhole component 16 is needed. In other words, the rear plate 16b is a service cover which allows to access the keyhole component 16 in a quick and simple manner. By this, clearances between key component 21 and keyhole component 16 may be set. Especially, during operation time the arrangement between the rear plate 16b and the front plate 16a may be shifted which can then be adjusted in a quick and simple manner in order to form an efficient positive connection with the key component 21, i.e. with as little clearance as possible.

Figure 3:
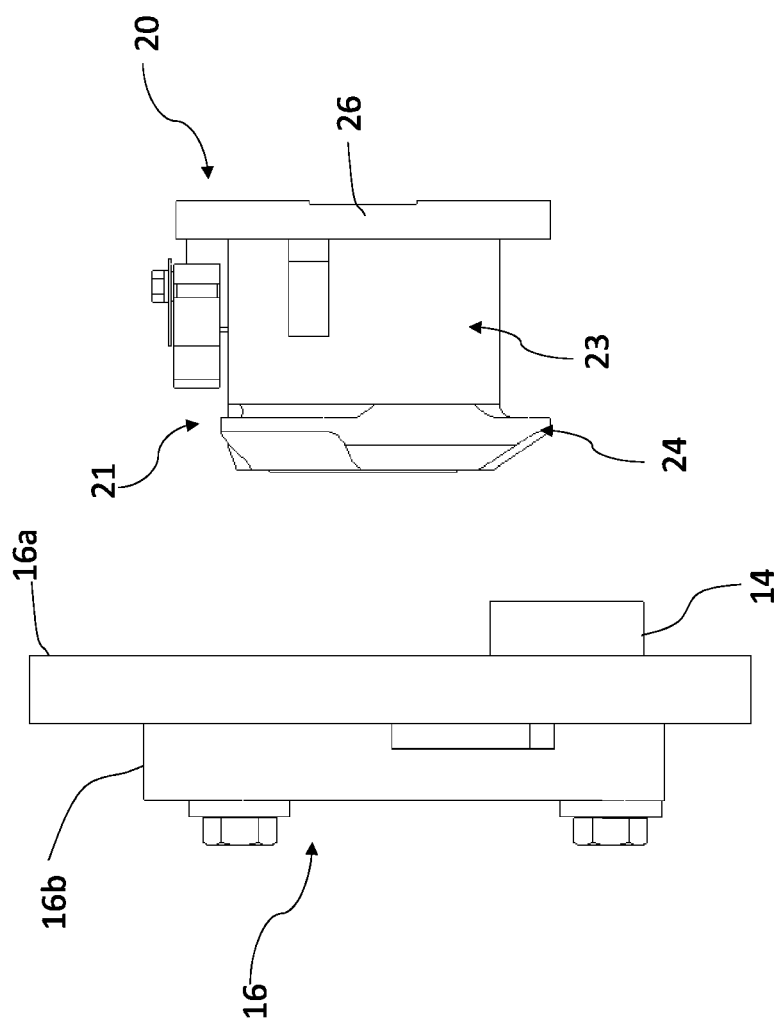
FIG. 3 schematically shows a keyhole component of the dozer blade and the trailer hitch device comprising a key component of the trailer hitch device according to some embodiments.

FIG. 3 shows schematically the trailer hitch device 20 and the keyhole component 16 of the dozer blade 10 according to some embodiments According to FIG. 3, the trailer hitch device 20 comprises a shaft journal 23 with at least one radially outwardly facing tooth 24, preferably three teeth 24, and a flange 26 for mounting a trailer hitch 30 (shown in FIG. 2). In other words, the trailer hitch device 20 is configured as a key component 21 such that it can be inserted into the keyhole component 16 of the dozer blade 10 forming a positive connection between the trailer hitch device 20 and the dozer blade 10.

According to some embodiments, the keyhole component 16 of the dozer blade 10 and the key component 21 of the trailer hitch device 20 are designed such that that they may form a bayonet joint.

Figure 4A:
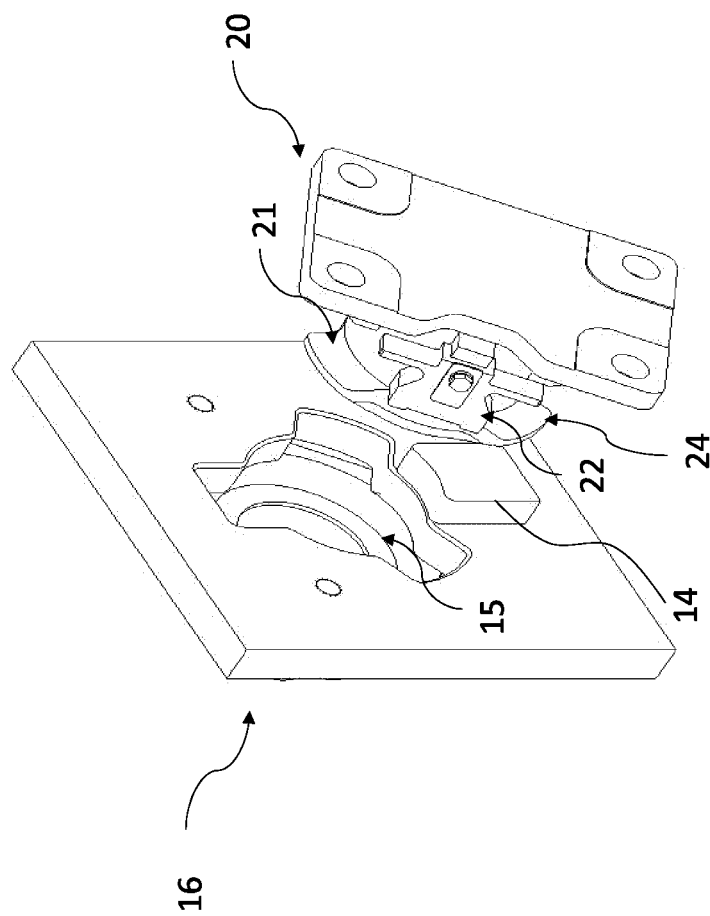
FIGS. 4a-c schematically show a perspective view of the trailer hitch device arranged in different positions in relation to the keyhole component of the dozer blade according to some embodiments.
Figure 4B:
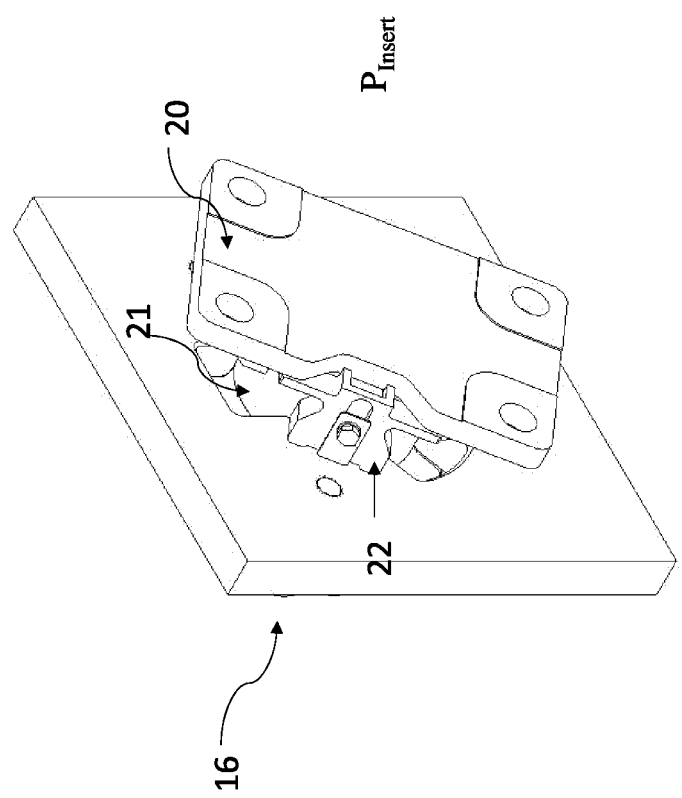
Figure 4C:
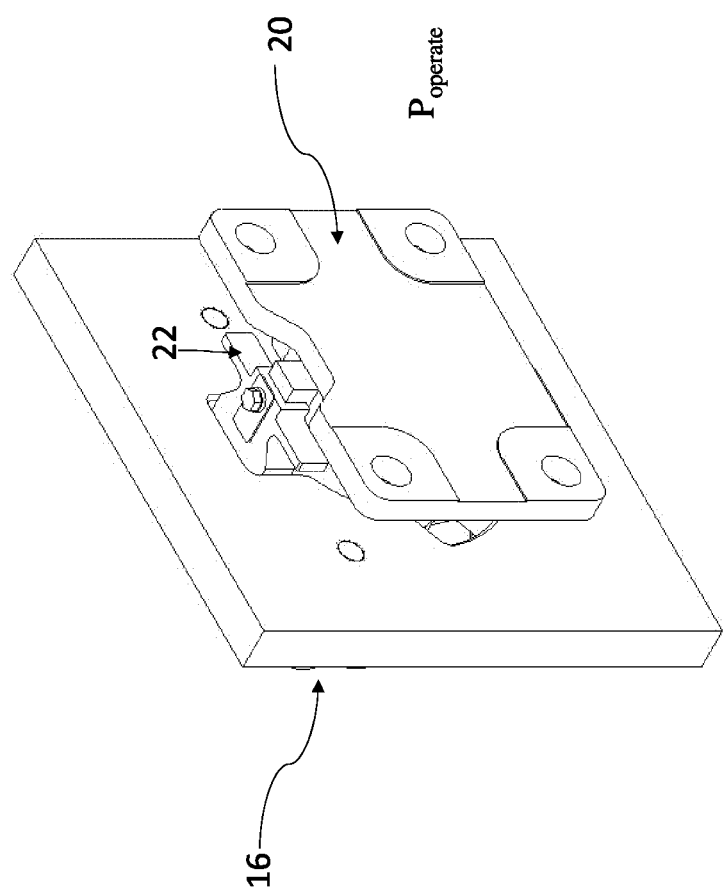

FIG. 4a-FIG. 4c schematically show a perspective view of the trailer hitch device 20 arranged in different positions to show the mounting or dismounting process respectively of the trailer hitch device 20 to the dozer blade 10. The front plate 16a of the keyhole component has a plug-in opening 15 having a mating contour which is provided for being engaging with an arresting contour of the key component 21 of the trailer hitch device 20. The positive connection is established by rotating the trailer hitch device 20 into the keyhole component 16 of the dozer blade 10. As shown in FIG. 4a the key component 21 of the trailer hitch device 20 can be inserted into the plug-in opening 15 when the trailer hitch device is positioned in an inserting position. After positioning the trailer hitch device 20 in the inserting position $P_{insert}$ as shown in FIG. 4b, the at least one tooth 24, preferably three teeth 24, of the key component 21 engages behind the front plate 16a when rotating the trailer hitch device in the operating position $P_{operate}$ as shown in FIG. 4c.

More specifically, when the key component 21 of the trailer hitch device 20 is inserted into the keyhole component 16, the teeth 24 are inserted through the plug-in opening 15 having a mating contour of the key component 21. When rotating the trailer hitch device 20 from the inserting position shown in FIG. 4b to the operating position shown in FIG. 4c, the teeth 24 are then arranged behind the front plate 16a forming a positive connection between the dozer blade 10 and the trailer hitch device 20.

Once the trailer hitch device 20 is positioned in the operation position $P_{operate}$ as shown in FIG. 4c, the trailer hitch device 20 may comprise a locking device 22 (as shown in more detail in FIGS. 5 and 6) to secure the trailer hitch device 20 in the operating position.

In an example, a positioning element 14 may be provided and coupled to the front plate 16a to ensure that the trailer hitch device 20 is correctly positioned so that a locking device 22 can always be operated from above.

Figure 5A:
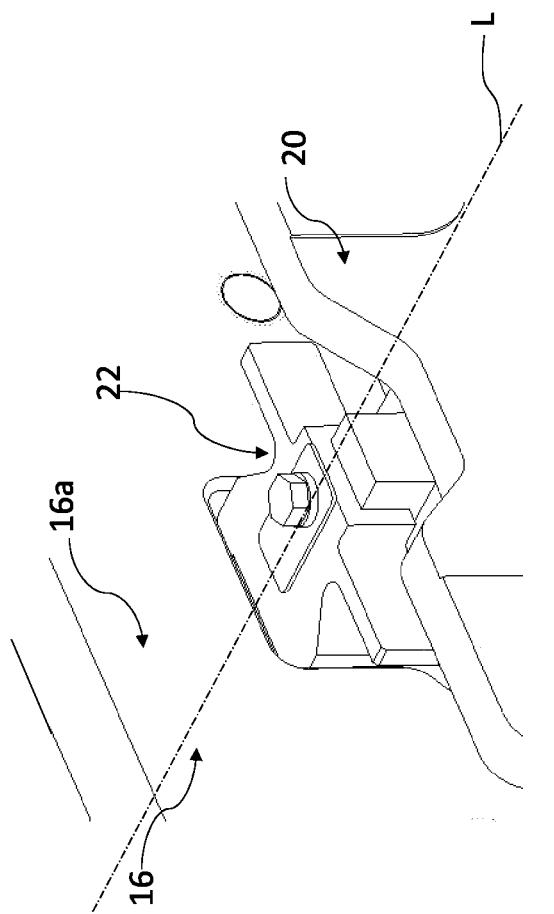
FIG. 5a and FIG. 5b schematically show a perspective view of a locking device of the trailer hitch device in a locking position and an unlocking position respectively according to some embodiments.
Figure 5B:
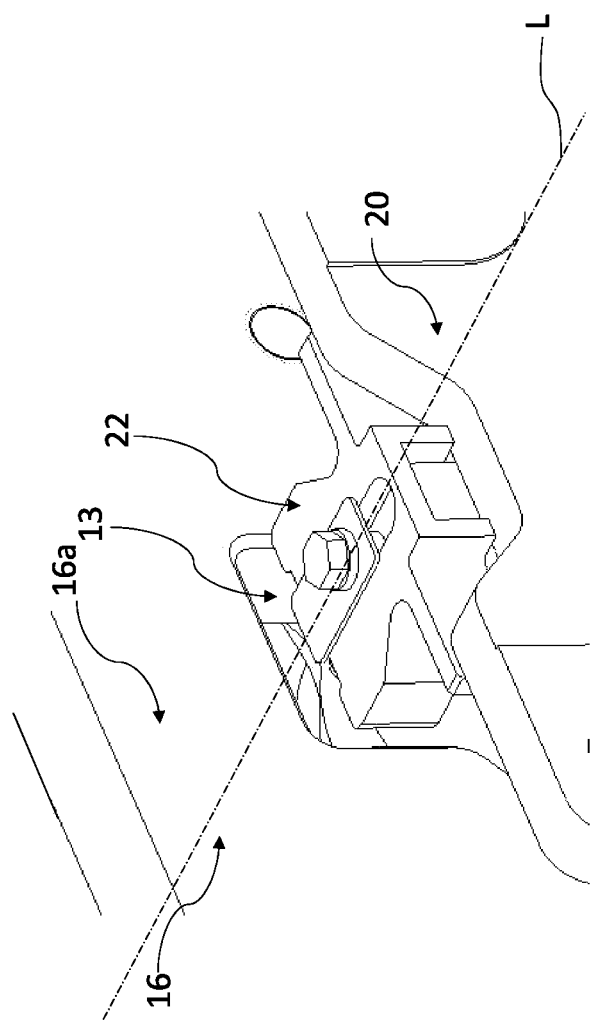

FIG. 5a-FIG. 5b schematically show a perspective view of a locking device of the trailer hitch device in a locking position and an unlocking position according to some embodiments. As shown, the locking device 22 is movable along a longitudinal direction L of the trailer hitch device in a locking position as shown in FIG. 5a and an unlocking position as shown in FIG. 5b.

As can be seen in FIG. 5a, the locking device 22, in a locking position, engages in the front plate 16a of the keyhole component, in particular in a portion 13 of the front plate 16a having the mating contour of a tooth of the key component, i.e. a recess having a mating contour of the tooth. Thus, the locking device 22 fixes the trailer hitch device 20 in a simple and reliable manner in the operating position by preventing the trailer hitch device 20 from turning out unintentionally from the operating position towards the inserting position.

Figure 6:
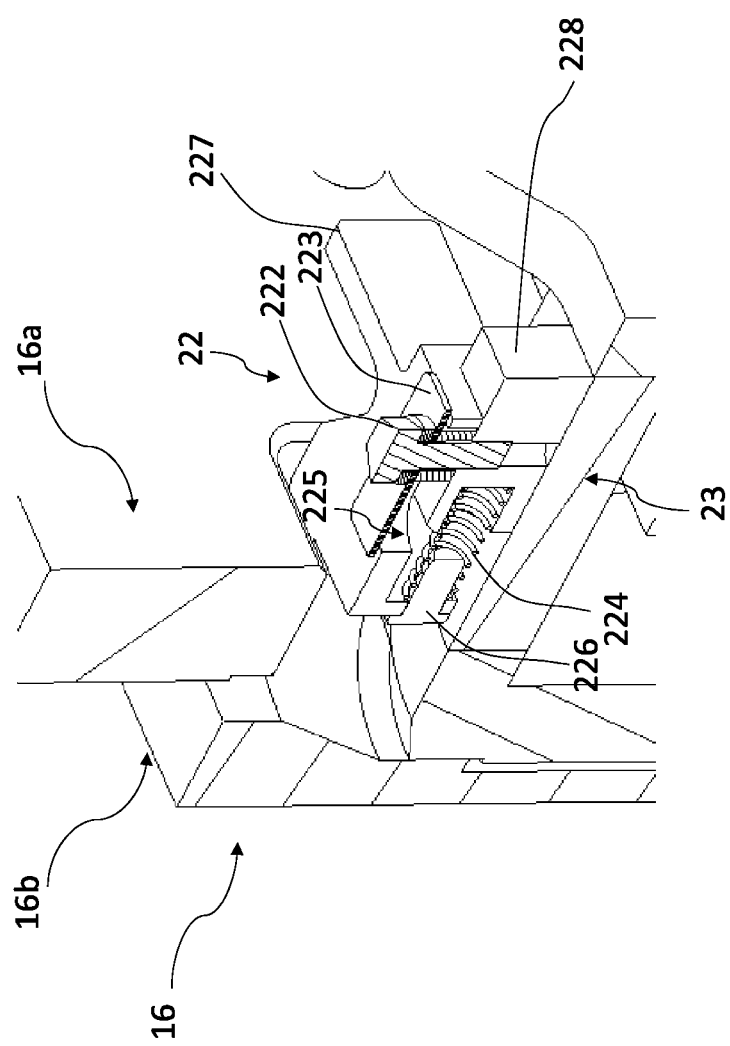
FIG. 6 schematically shows a sectional view of the locking device shown in FIG. 5 according to some embodiments.

FIG. 6 schematically shows a sectional view of the locking device shown in FIG. 5 according to some embodiments. The locking device 22 may be spring 224 biased so that the locking device 22 automatically switches into the locking position. This is advantageous, because the user only needs to position the trailer hitch device 20 into the operating position leading to an automatic snapping of the locking device 22 into the front plate 16a of the dozer blade, i.e. the recess having a mating contour of the tooth. More specifically, when the trailer hitch device 20 is not placed in the operating position as shown in FIG. 4b the locking device 22 interacts with the front plate 16a of the keyhole component in such a way that the spring 224 of the locking device 22 is preloaded. Then, when the trailer hitch device 20 is positioned in the operating position as shown in FIG. 4c the locking device snaps into the recess as shown in FIG. 5a having a mating contour of the tooth fixing the trailer hitch device 20 in the operating position.

More specifically, the locking device 22 may comprise a slide 227 and a guide 228. The guide 228 being arranged on the shaft journal 23 such that the slide 227 is slidable along the longitudinal direction L. Further, the locking device 22 may comprise a centering element 226 for the spring 224. Preferably, the slide 227 may comprise a slotted hole 225. The slide 227 may be connected to the guide 228 via the slotted hole 225 by means of a screw 222 and a washer 223 in such a way that the slide 227 is guided along the limits defined by the slotted hole 225 in the longitudinal direction L.

The washer 223 may be arranged between the screw head and the slide 227, in order to enables the sliding movement of the slide 227 in longitudinal direction L. The slide 227 may have a hook-like structure at the end facing the front plate 16a, which is connected to the spring 224 in such a way so that the slide 227 interacts with the spring 224 when the slide 227 is actuated in longitudinal direction L. In the locked position as shown in FIG. 6 and FIG. 5a, the spring 24 is unloaded. When the locking device 22 is transferred in the unlocked position the hook-like structure presses against the spring 24 so that the spring 24 is preloaded when the locking device 22 is in the unlocked position as shown in FIG. 4b and FIG. 5b.

Thus, if the user wants to demount the trailer hitch device 20, the locking device 22 may be pulled in longitudinal direction L away from the front plate 16a so that the locking device 22 is in the unlocked position as shown in FIG. 5b. Then, the trailer hitch device may be turned into the inserting position. When positioned in the inserting position, the trailer hitch device can be pulled out from the dozer blade 10.

Figure 7C:
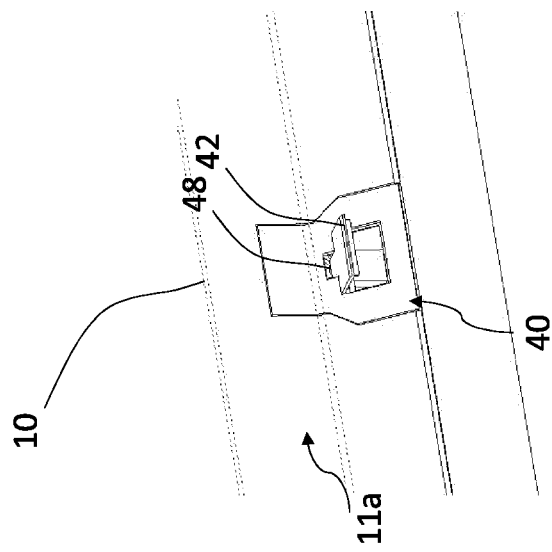
FIGS. 7a-c schematically show a blind cover which is mounted on the dozer blade when the trailer hitch device is not coupled to the dozer blade according to some embodiments.
Figure 7B:
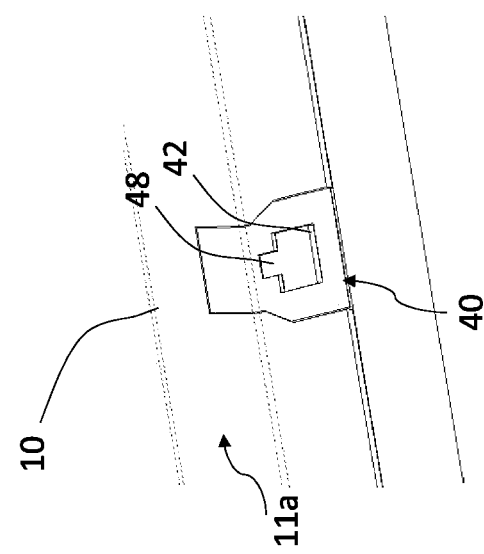
Figure 7A:
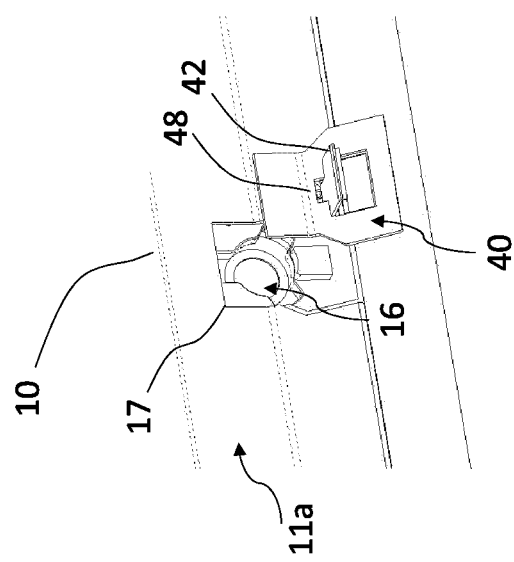

FIG. 7a-c show a blind cover 40 which is mounted when the trailer hitch device is not coupled to the dozer blade 10. The blind cover 40 is mounted on the dozer blade 10 from the front portion 11a of the dozer blade in order to cover the keyhole component 16 of the dozer blade 10. The contour of the blind cover 40 is complementary to the contour of the cut-out 17 of the dozer blade at the front surface 10a. By this, if a trailer is not coupled to the dozer plate 10, the keyhole component 16 and the cut-out 17 of the dozer blade 10 are covered by the blind cover 40 so that an essentially continuous surface is established in width and height direction of the dozer blade when the dozer blade 10 is in use.

Further, the keyhole component 16 is protected from the moved mass, e.g. dirt and debris, of the dozer plate when in use. FIG. 7a shows the blind cover 40 being mounted on the dozer blade 10. FIGS. 7b and 7c show the blind cover 40 mounted on the dozer blade 10. In order to or demount the blind cover 40 to the dozer blade 10, the blind cover 40 may comprise a pivoting lever 42 which is outwardly pivotable with respect to the front surface 10a of the dozer blade 10. As shown in FIG. 7b, the pivoting lever lies in the plane of the blind cover 40, i.e. being flush with the blind cover, in a closed position and is pivotable to an open position as shown by FIG. 7a and FIG. 7c by actuating an upper portion 48 of the pivoting lever 42.

Figure 8:
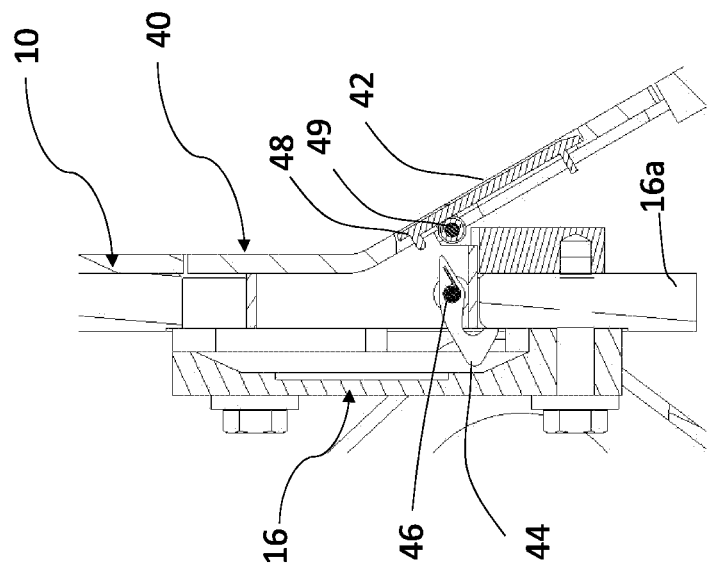
FIG. 8 schematically shows a sectional view of the blind cover mounted on the dozer blade according to some embodiments.

FIG. 8 shows a sectional view of the blind cover 40 mounted in the dozer blade 10 according to some embodiments. The blind cover 40 may comprise a locking hook 44 which engages with the front plate 16a of the keyhole component 16 when the blind cover is mounted into the dozer blade 10 in order to secure the blind cover from falling out of the dozer plate 10. The locking hook 44 may be spring loaded with a first torsion spring 46. The pivot lever 42 may be spring loaded with a second torsion spring 49. In addition, the upper portion 48 of the pivoting lever 42 may comprise a projection projecting inwards with respect to the front surface of the dozer blade 10 such that when pivoting the pivoting lever 42 outwardly the projection interacts with the locking hook 44 so that the locking hook 44 can be disengaged.

Figure 9C:
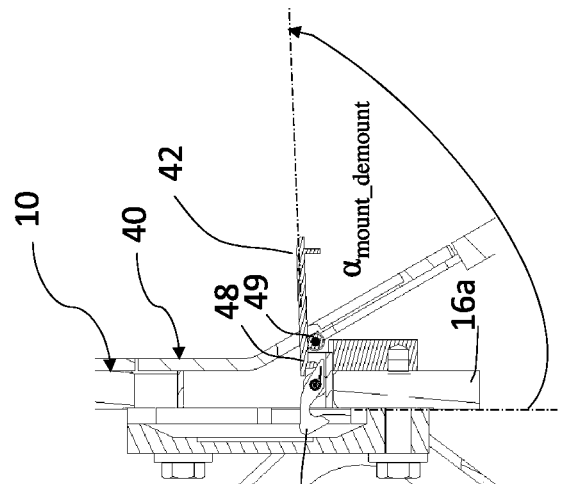
FIG. 9a-FIG. 9e show the blind cover with a pivoting lever in different mounting positions according to some embodiments.
Figure 9B:
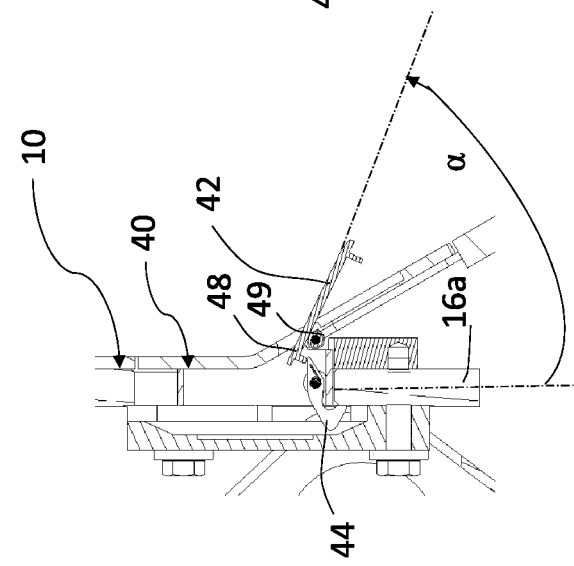
Figure 9A:
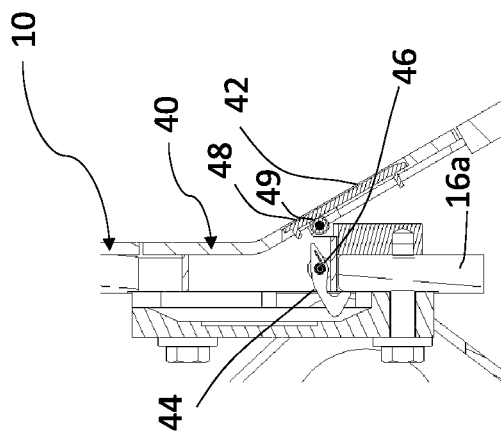

FIGS. 9a-e show the blind cover 40 with the pivoting lever 42 in different mounting positions. FIG. 9a show the blind cover 40 in a mounting state in the dozer blade 10. The locking hook 44 is biased with the first torsion spring 46 in the engaged position. The pivoting lever 42 is biased with the second torsion spring 49 in the closed position. In order to unlock the locking hook 44, the upper portion 48 may be actuated such that the pivoting lever 42 is pivoted outwardly as shown in FIG. 9b. As can be seen, the pivoting lever 42 can be pivoted in a certain angle space without actuating the locking hook 44. This is advantageous, as the locking hook 44 is not unlocked instantly when the upper portion 48 is actuated. This prevents the blind cover 40 from falling out of the dozer blade 10 when stones or debris may act in an undesired manner on the upper portion 48. Thus, the pivoting lever 42 and the locking hook 44 are configured in such a manner that the locking hook 44 is unlocked only when the pivoting lever 42 is pivoted up to a predetermined angular position $\alpha_{mount\_demount}$ as shown in FIG. 9c.

As can be seen in FIG. 9c, by actuating the upper portion 48 of the pivoting lever 42 such that the pivoting lever 42 is pivoted in the predetermined angular position $\alpha_{mount\_demount}$, the locking hook 44 is disengaged from the front plate 16a and can be dismounted from the dozer blade 10 if desired. The upper portion 48 may be dimensioned such that concentrated application of force by a hand, preferably one to two fingers of a user can actuate the pivoting lever 42 such that the pivoting lever 42 is pivoted to the predetermined angular position $\alpha_{mount\_demount}$. In an example, after having pivoted the pivoting lever 42 out of the blind cover 40 by activating the upper region 48, a user can grab the pivoting lever 42 at the lower end. The user does not have to activate the upper region 48 permanently in order to bring the pivoting lever to the predetermined angular position $\alpha_{mount\_demount}$.

Because a concentrated application of force on the upper portion 48 is needed to pivot the pivoting lever 42 to the predetermined angle $\alpha_{mount\_demount}$, it is avoided that the upper portion 48 is actuated in such a predetermined angle $\alpha_{mount\_demount}$ by the moved mass, e.g. stones or debris, of the dozer blade.

Figure 9E:
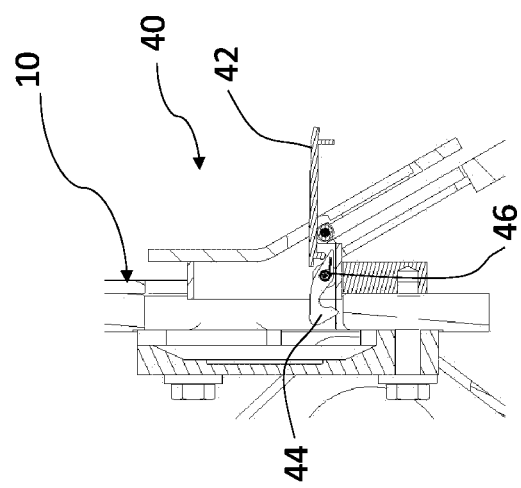
Figure 9D:
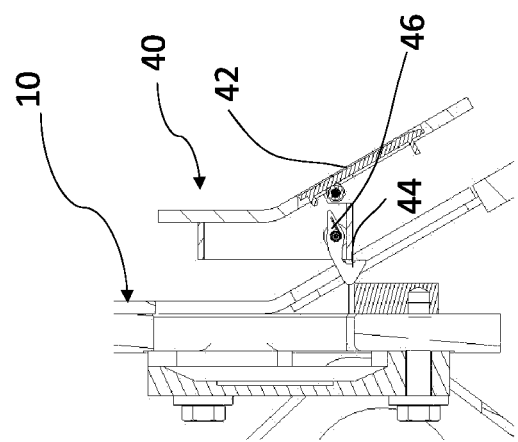

Vice versa, as shown in FIG. 9d-e, the same principle applies for mounting the blind cover 40 in the dozer blade 10. As shown in FIG. 9d, when the blind cover 40 is moved toward the dozer blade 10, the locking hook may interact with the front plate 16a, so that the locking hook 44 is pivoted upwards by pressing against the front plate 16a so that the blind cover can be inserted into the dozer blade 10.

FIGS. 10 and 11 show a connection box 50 mounted of the dozer blade 10 with a cover 52. The connection box 50 comprises electrical and/or hydraulic connections 58, wherein the connection box 50 is arranged at the front surface of the dozer blade 10 so that the electrical and/or hydraulic connector of the trailing hitch are connectable from the front portion of the dozer blade 10. By this, the connection of the electrical and hydraulic connections can be connected in a simple and quick manner without accessing the rear portion of the dozer blade.

Figures 10A, 10B:
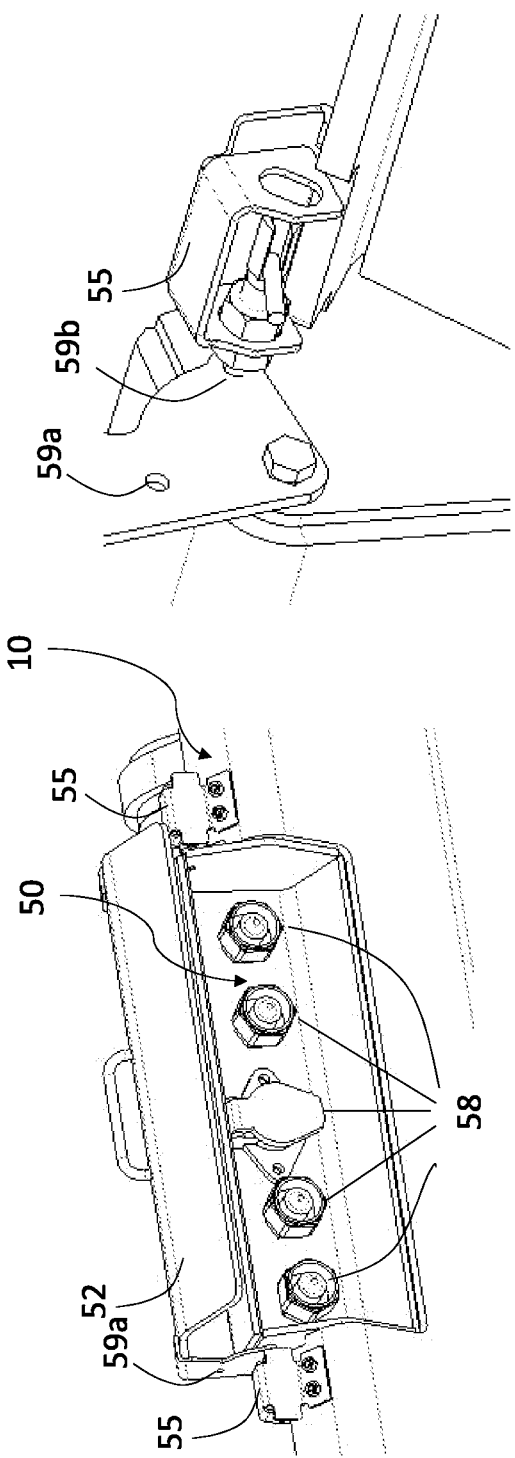
FIG. 10a shows a connection box with an open cover arranged on the dozer blade according to some embodiments.
FIG. 10b shows a locking pin for arranging the cover of the connection box in the open position according to some embodiments.
Figure 11B:
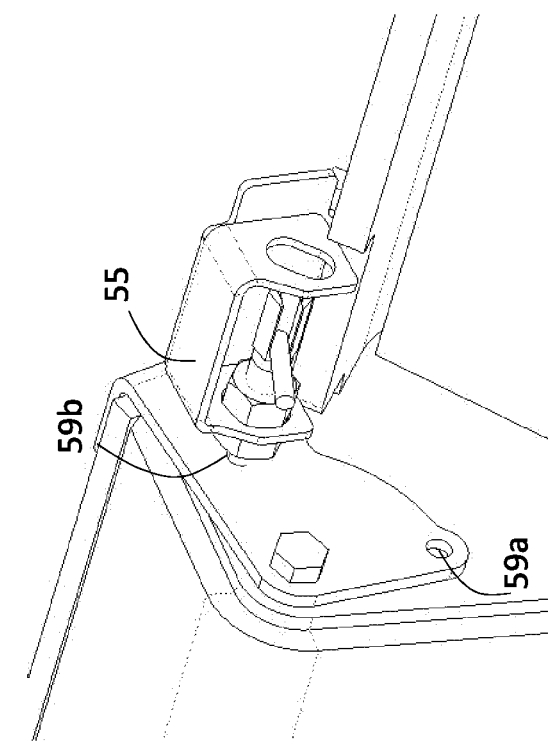
FIG. 11b shows a locking pin for arranging the cover of the connection box in the closed position according to some embodiments.
Figure 11A:
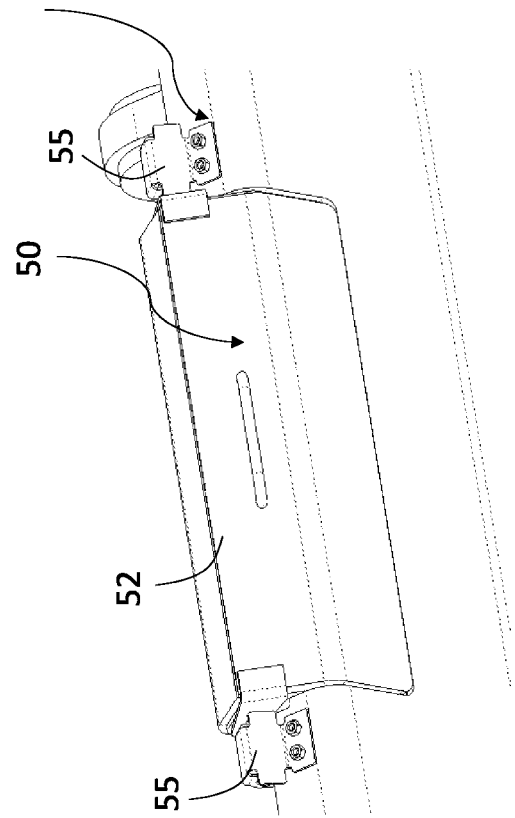
FIG. 11a shows a connection box with a closed cover arranged on the dozer blade according to some embodiments.

The cover 52 of the connection box 50 is movable in a closed position as shown in FIG. 11a and in an open position as shown in FIG. 10a.

As shown in FIG. 10b and FIG. 11b a locking pin 55 may be arranged on both sides of the connection box 50 and configured such that the locking pin 55 is engageable in a first recess 59b to hold the cover 52 in an open position and in a second recess 59a to hold the cover in a closed position. This protects the connections from dirt and debris when the dozer blade is in use and no trailer is coupled to the dozer blade.

According to some embodiments, an excavator coupling system for coupling a trailer hitch device to a dozer blade of an excavator, comprising a keyhole component disposed on a front surface of the dozer blade of the excavator and a key component coupled with the trailer hitch device and configured to form a positive connection to couple the trailer hitch device to the dozer blade, wherein the keyhole component and the key component provide for coupling the trailer hitch device to the dozer blade without accessing a rear portion of the dozer blade. By this, mounting and dismounting of a trailer is simplified as it is possible for a user to mount a trailer hitch device with a trailer hitch from a front portion of the dozer blade only without cumbersome handling at the rear portion of the dozer blade. In addition, the provided coupling system improves the ergonomics and safety for the user.

The dozer blade comprises a front surface and a rear surface and the positive connection is established within the dozer blade between the front surface and the rear surface. In other words, a trailer hitch device is simply arranged from the front region of the dozer blade. There is no need to fix the trailer hitch device from behind the dozer blade. Further, no screwing operations or tools are needed to fix the trailer hitch device to the dozer blade.

According to some embodiments, the trailer hitch device comprises a shaft journal with at least one radially outwardly facing tooth and a flange for mounting a trailer hitch. In other words, the shaft journal with at least one radially outwardly facing tooth functions as a key component which can be inserted into the keyhole component of the dozer blade forming a positive connection.

Preferably, the keyhole component comprises a front plate and a rear plate, wherein the front plate preferably has a plug-in opening having a mating contour which is provided for being engaging with an arresting contour of the key component of the trailer hitch device, wherein the positive connection is established by rotating the trailer hitch device into the keyhole interface of the dozer blade. This coupling principle achieves a stable and reliable positive connection between the dozer blade and the trailer hitch by simple handling operations. By this, the trailer hitch device can be mounted on the dozer blade without the need to use further tools and means such as screws or bolts to establish a positive connection between the dozer blade and the trailer hitch device.

The rear plate in the front plate of the keyhole component form a doubling plate providing the keyhole component. This enables an efficient and simple structure of the keyhole component which can be easily integrated into the dozer blade. For example, the keyhole component may be arranged in a cut-out of the dozer blade.

Further preferably, the key component of the trailer hitch device can be inserted into the plug-in opening when the trailer hitch device is positioned in an inserting position, wherein the at least one tooth of the key component engages behind the front plate when rotating the trailer hitch device in the operating position. More specifically, when the trailer hitch device is inserted into the keyhole component the tooth of the shaft journal is inserted through the opening having a mating contour of the tooth. When rotating the trailer hitch device, the tooth is then arranged behind the front plate, i.e. the tooth engages in the undercut of the keyhole component, forming a positive connection between the dozer blade and the trailer hitch device.

The rotational movement of the trailer hitch device is defined as a rotational movement around the longitudinal axis of the trailer hitch device. The longitudinal direction is defined as being the essentially perpendicular to keyhole component, e.g. the front plate of the keyhole component.

According to some embodiments, the keyhole component of the dozer blade and the key component of the trailer hitch device are designed such that that they form a bayonet joint. In that regard, the key component, in particular the tooth of the shaft journal of the trailer hitch device, comprises specific shapes, e.g. conical or tapered sections, which mates the shape of the keyhole component. Specifically, the tooth of the key component interacts with the keyhole component after the rotational movement in the operating position in such a way that the tooth is pressed into the keyhole component so that a frictional connection is created in addition to the positive connection. By this, a stronger connection can be established in the operating position. By this, the frictional connection, i.e. non-positive connection, prevents the trailer hitch device from turning out from the operating position towards the inserting position.

According to an alternative embodiment, the trailer hitch device comprises a locking device to secure the trailer hitch device in the operating position, wherein the locking device is movable along the longitudinal direction of the shaft journal in a locking position and an unlocking position, wherein, in a locking position, the locking device engages in the front plate of the keyhole component, in particular in a portion of the front plate having the mating contour of a tooth of the key component, i.e. a recess having a mating contour of the tooth. Thus, the locking device fixes the trailer hitch device in a simple and reliable manner in the operating position by preventing the trailer hitch device from turning back from the operating position towards inserting position and to falling out unintentionally from the dozer blade.

Preferably, the locking device is spring biased so that the locking device automatically switches into the locking position. This is advantageous, because the user only needs to position the trailer hitch device into the operating position leading to an automatic snapping of the locking device into the front plate of the dozer blade, i.e. the recess having a mating contour of the tooth. More specifically, when the trailer hitch device is not placed in the operating position the locking device interacts with the front plate of the keyhole component in such a way that the spring of the locking device is preloaded. When the trailer hitch device is positioned in the operating position the locking device snaps automatically into the recess having a mating contour of the tooth securing the trailer hitch device in the operating position.

Further preferably, the locking device comprises a slide and a guide, the guide being arranged on the shaft journal such that the slide is slidable along the longitudinal direction.

Preferably, the dozer blade comprises a blind cover in order to cover the keyhole component of the dozer blade. By this, if the trailer is not coupled to the dozer plate the keyhole component is covered by the blind cover so that an essentially continuous surface of the dozer blade is reestablished when the dozer blade is in use. Further, the keyhole component is protected from the moved mass of the dozer plate, e.g. dirt and debris. Thus, if a trailer is to be coupled to the dozer blade after operation of the dozer blade, the user does not need to remove the dirt or debris in the keyhole component before coupling the trailer hitch device. This allows the user a quick and easy coupling even if the excavator has moved heavy material with the dozer blade before.

Preferably, the blind cover comprises a pivoting lever outwardly pivotable with respect to the front surface of the dozer blade, the pivoting lever lying in the plane of the blind cover in a closed position and being pivotable to an open position by actuating an upper portion of the pivoting lever.

Further preferably, the blind cover comprises a locking hook which engages with the front plate of the keyhole component when the blind cover is mounted into the dozer blade in order to secure the blind cover from falling out of the dozer plate, the locking hook being unlocked when the upper portion is actuated such that the pivoting lever is pivoted to a predetermined angular position in the open position.

The pivoting lever and the locking hook pivot around an axis which is arranged perpendicular to the longitudinal direction of the trailer hitch device. The predetermined angular position is being defined as being enclosed between the gravitational direction and the plane of the pivoting levers.

Specifically, by actuating the upper portion the pivoting lever is pivoted in the predetermined angular position and the locking hook is disengaged from the front plate, wherein the locking hook is biased with a first torsion spring in the engaged position, wherein the pivot lever is biased with a second torsion spring in the closed position, wherein, preferably, the upper portion comprises a projection projecting inwards with respect to the front surface of the dozer blade.

In other words, the pivoting lever is configured to mount or demount the blind cover into the dozer blade. Specifically, the pivoting lever is pivoted outwardly by actuating the upper portion. When the pivoting lever is positioned at the predetermined angular position, the blind cover can be mounted or dismounted in the dozer blade.

According to some embodiments, the dozer blade comprises a connection box comprising electrical and/or hydraulic connections, wherein the connection box is arranged at the front surface of the dozer blade so that the electrical and/or hydraulic connector of the trailing hitch are connectable from the front of the dozer blade. By this, the connection of the electrical and hydraulic connections can be connected in a simple and quick manner without accessing the rear portion of the dozer blade.

Preferably, the connection box comprises a cover which is movable in a closed and open position, wherein a locking pin is configured such that the locking pin is engageable in a first recess to hold the cover in an open position, and a second recess to hold the cover in a closed position. This protects the connections from dirt and debris when the dozer blade is in use and no trailer is coupled to the dozer blade.

INDUSTRIAL APPLICABILITY

With reference to FIGS. 1 to 11, an excavator coupling system 1 for coupling a trailer hitch device 20 to an excavator is suggested. The coupling system as mentioned above are applicable in and in connection with off road equipment, e.g. dozers, loaders, excavators, motor graders, and other types of heavy machinery. The suggested coupling system may replace conventional coupling systems for coupling a trailer to an excavator.

It will be obvious for a person skilled in the art that these embodiments and items only depict examples of a plurality of possibilities. Hence, the embodiments shown here should not be understood to form a limitation of these features and configurations. Any possible combination and configuration of the described features can be chosen according to the scope of the invention.

The invention claimed is:

1. An excavator coupling system for coupling a trailer hitch device to a dozer blade of an excavator, the dozer blade having a front surface and a rear surface, the excavator coupling system comprising:
a keyhole component to be disposed on the dozer blade rearward of the front surface, the keyhole component including a keyhole member;
the trailer hitch device including a key component configured to form a positive connection with the keyhole component to couple the trailer hitch device to the dozer blade, wherein the keyhole component and the key component provide for coupling the trailer hitch device to the dozer blade without accessing a rear portion of the dozer blade;
wherein the trailer hitch device includes a mounting portion to receive a trailer hitch;
wherein the trailer hitch device includes a shaft journal and at least one radially outwardly facing tooth insertable into the keyhole component for forming the positive connection with the keyhole component within the dozer blade between the front surface and the rear surface; and
wherein the trailer hitch device includes a locking device to secure the trailer hitch device to the keyhole component in an operating position, wherein the locking device is movable along a longitudinal direction of the shaft journal between a locking position and an unlocking position, wherein, in the locking position, the locking device engages the keyhole member of the keyhole component to secure the trailer hitch device in the operating position.

2. The excavator coupling system according to claim 1, wherein the trailer hitch device includes a flange for mounting a trailer hitch.

3. The excavator coupling system according to claim 1, wherein the keyhole member has a plug-in opening having a mating contour to engage an arresting contour of the key component of the trailer hitch device, wherein the positive connection is established by rotating the key component relative to the keyhole component of the dozer blade.

4. The excavator coupling system according to claim 3, wherein the key component of the trailer hitch device is insertable into the plug-in opening of the keyhole member when the trailer hitch device is positioned in an inserting position, wherein the arresting contour of the key portion of key component includes the at least one tooth that engages behind the keyhole member when the trailer hitch device is rotated to an operating position.

5. The excavator coupling system according to claim 1, wherein the keyhole component of the dozer blade and the key component of the trailer hitch device form a bayonet joint.

6. The excavator coupling system according to claim 1, wherein the keyhole member has a plug-in opening having a mating contour to engage the key component wherein, in the locking position, the locking device engages with the keyhole member of the keyhole component in a portion of the keyhole member where the mating contour is shaped to receive the at least one tooth of the key component.

7. The excavator coupling system according to claim 6, wherein the locking device is spring biased toward the locking position.

8. The excavator coupling system according to claim 6, wherein the locking device comprises a slide and a guide, the guide being arranged on the shaft journal such that the slide is slidable along the longitudinal direction.

9. The excavator coupling system according to claim 1, wherein the dozer blade comprises a blind cover to cover the keyhole component of the dozer blade.

10. The excavator coupling system according to claim 9, wherein the blind cover comprises a pivoting lever outwardly pivotable with respect to the front surface of the dozer blade, the pivoting lever lying in a plane of the blind cover in a closed position and being pivotable to an open position to actuate an upper portion of the pivoting lever.

11. The excavator coupling system according to claim 10, wherein the blind cover comprises a locking hook which engages with the keyhole member of the keyhole component when the blind cover is mounted to the dozer blade to secure the blind cover from falling out of the dozer blade, the locking hook being unlocked when the upper portion is actuated such that the pivoting lever is pivoted to a predetermined angular position in the open position.

12. The excavator coupling system according to claim 11, wherein actuating the upper portion disengages the locking hook from the keyhole member, wherein the locking hook is biased with a first torsion spring toward the engaged position, wherein the pivot lever is biased with a second torsion spring toward the closed position, wherein the upper portion comprises a projection projecting inwards with respect to the front surface of the dozer blade.

13. The excavator coupling system according to claim 1, wherein the dozer blade comprises a connection box comprising electrical and/or hydraulic connections, wherein the connection box is arranged at the front surface of the dozer blade so that the electrical and/or hydraulic connections of the trailer hitch are connectable from the front of the dozer blade.

14. The excavator coupling system according to claim 13, wherein the connection box comprises a cover which is movable between a closed and open position, wherein a locking pin is configured such that the locking pin is engageable in a first recess to hold the cover in an open position, and a second recess to hold the cover in a closed position.

* * * * *